United States Patent Office 3,338,107
Patented Aug. 29, 1967

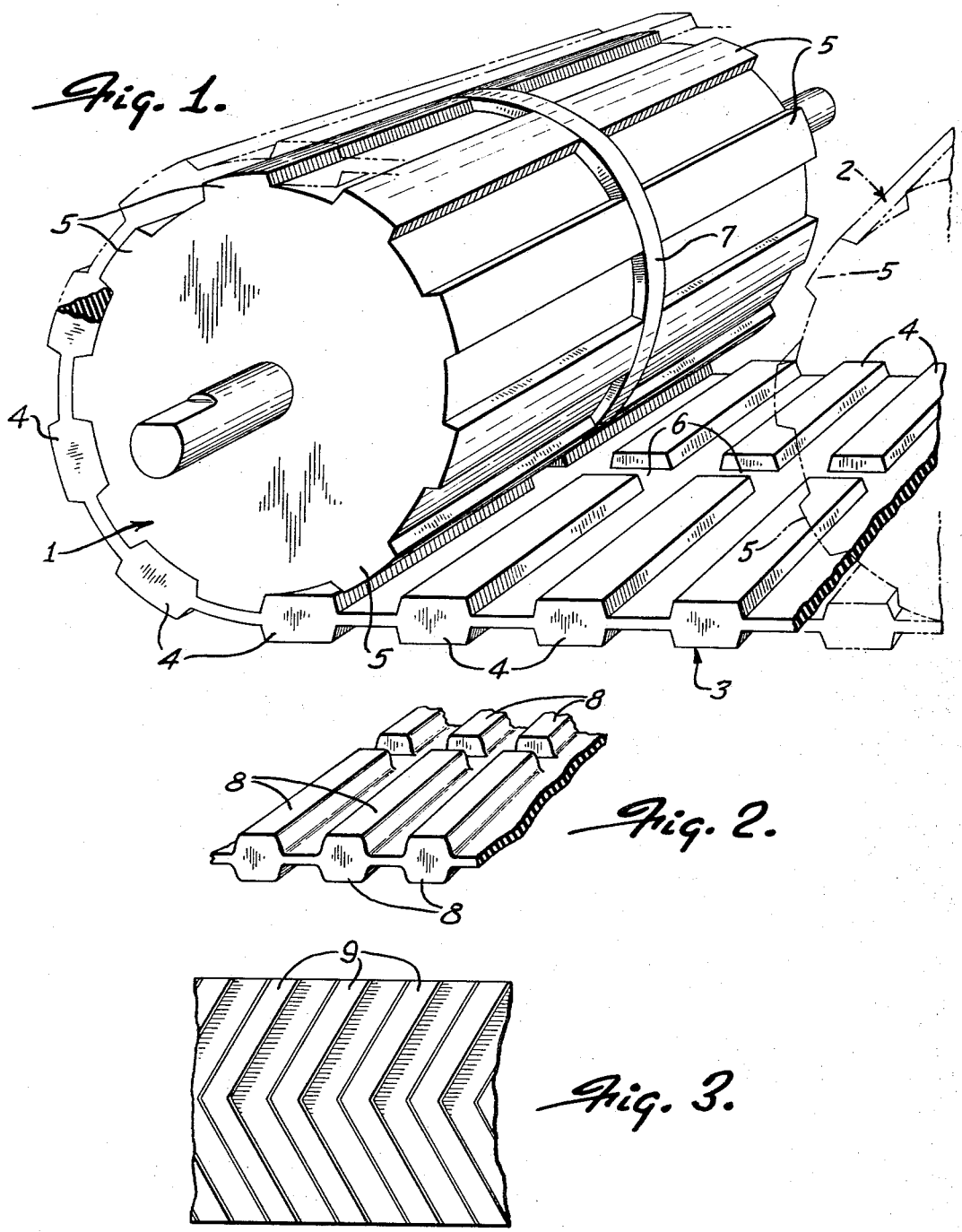
Aug. 29, 1967     E. C. KIEKHAEFER     3,338,107
POSITIVE DRIVE SYSTEM
Filed Feb. 15, 1965
INVENTOR.
ELMER CARL KIEKHAEFER
BY
Andrus & Starke
ATTORNEYS

3,338,107
POSITIVE DRIVE SYSTEM
Elmer Carl Kiekhaefer, Winter Haven, Fla., assignor to Kiekhaefer Corporation, Fond du Lac, Wis., a corporation of Delaware
Filed Feb. 15, 1965, Ser. No. 432,676
2 Claims. (Cl. 74—229)

This invention relates to a positive drive system employing a reversible positive drive belt.

A flat belt is employed with spaced cogs integral thereon and which fit between corresponding cogs on the drive and driven pulleys.

According to one feature of the invention cogs are disposed on opposite sides of the belt so that when one set of cogs becomes worn the belt may be reversed and the other set of cogs will function temporarily until the belt can be replaced.

According to another feature of the invention the belt is centered at all times on one or both of the pulleys by providing a circumferential ridge on the pulley of the same height as the cogs thereon, and a corresponding recess in the cogs on the belt to provide a groove for receiving the ridge.

The invention is illustrated in the accompanying drawings of a construction presently contemplated as the best mode of carrying out the invention.

In the drawings:

FIGURE 1 is a perspective view of the drive system with parts broken away and sectioned to illustrate the invention;

FIG. 2 is a detail perspective view showing the use of stub teeth instead of cogs; and FIG. 3 is a detail plan view of a portion of a belt showing the use of a herring bone cog system.

The drive system illustrated comprises a drive pulley 1, a driven pulley 2 and a belt 3.

The belt 3 has a one-piece flexible flat body extending in a loop which encircles the pulleys 1 and 2. A series of cogs 4 extend transversely of the belt 3 on opposite sides thereof and are spaced longitudinally of the belt to receive therebetween corresponding cogs 5 on the pulleys 1 and 2. The cogs 4 on opposite sides of the belt are disposed opposite each other so that the body of the belt in between adjacent cogs remains flexible. The cogs 5 provide recesses therebetween for receiving cogs 4 and transmitting power to the belt.

The cogs 4 extend all of the way across the width of the belt with the exception of an interruption preferably at the center to provide a space or recess 6 substantially aligned longitudinally of the belt with corresponding recesses 6 of all of the other cogs so that the belt can be centered on the pulleys by means of a continuous circumferential ridge 7 on one of the pulleys of a hight corresponding to cogs 5 and which fits into the successive adjacent recesses 6. The other pulley or pulleys preferably do not have a ridge 7 so that some tolerances can exist in regard to alignment of the pulleys without tending to injure the belt. In the construction shown the drive pulley 1 has the ridge 7 for aligning the belt.

The pulleys are generally crowned to provide proper belt action thereon, and in some instances the crown will be sufficient to center the belt without the need for the recesses 6 and ridge 7.

In FIG. 1 the cogs 4 and 5 are shown as being of the slot type with flat tops of substantial area and substantially straight perpendicular sides.

In FIG. 2 the cogs are shown as formed of stub teeth 8 simulating gear teeth.

In FIG. 3 the cogs 9 are shown as being arranged diagonally in a herring bone pattern which reduces the flexibility of the belt and stresses the belt laterally during driving operations, but which is smoother and substantially less noisy in operation. Where a herring bone pattern is employed for the cogs 9 the belt becomes self centering on the pulleys and there is no need for the recesses 6 and ridge 7 for this purpose.

The drive system and belt may have various uses in power transmission and may be employed in an endless track drive for vehicles such as snow sleds. In that instance there need be no driven pulley. Pulley 2 would then become an idler pulley with possible additional idler supports for the bottom flight of the belt as by a shoe or a series of small rollers as is known in the construction of endless track vehicles.

Various modes of carrying out the invention are contemplated as being within the scope of the following claims particularly pointing out and distinctly claiming the subject matter which is regarded as the invention.

I claim:

1. A positive drive system employing a drive pulley and a flat belt mounted thereon with a belt path extending to at least one other pulley over which the belt passes, characterized by a positive interlock between the drive pulley and the belt in which the surface of the drive pulley has two laterally spaced circumferential sections each having a plurality of circumferentially spaced laterally extending cogs and a continuous circumferential ridge between the two sections centrally of the pulley face and of a height corresponding to said cogs, and the drive surface of the belt has two laterally spaced sections of cogs adapted to interlock with the corresponding sections of said pulley face with each belt cog fitting in the space between two cogs on the pulley to interlock therewith and with the continuous central ridge on the pulley fitting in the space between the two sections of cogs on the belt to guide the belt at all times in alignment with said drive pulley, said drive pulley being the only pulley of the drive system with a lateral guide interlock with said belt.

2. The construction of claim 1 in which the belt has corresponding cogs on both inner and outer surfaces thereof and is reversible for emergency use in the event the drive interlock becomes damaged.

References Cited

UNITED STATES PATENTS

| 2,770,977 | 11/1956 | Beckadolph et al. | 74—229 |
| 2,838,946 | 6/1958 | Kiekhaefer | 74—229 |
| 3,033,050 | 5/1962 | Hisserick | 74—229 |
| 3,078,205 | 2/1963 | Sauer et al. | 74—231 X |
| 3,169,262 | 2/1965 | Allen et al. | 74—229 X |

FOREIGN PATENTS

| 1,070,189 | 2/1954 | France. |
| 1,166,734 | 6/1958 | France. |

FRED C. MATTERN, Jr., *Primary Examiner.*

DAVID J. WILLIAMOWSKY, *Examiner.*

J. A. WONG, *Assistant Examiner.*